United States Patent
Lunt et al.

(10) Patent No.: US 7,478,078 B2
(45) Date of Patent: Jan. 13, 2009

(54) METHOD FOR SHARING RELATIONSHIP INFORMATION STORED IN A SOCIAL NETWORK DATABASE WITH THIRD PARTY DATABASES

(75) Inventors: Christopher Lunt, Mountain View, CA (US); Nicholas Galbreath, San Francisco, CA (US)

(73) Assignee: Friendster, Inc., Mountain View, CA (US)

( * ) Notice: Subject to any disclaimer, the term of this patent is extended or adjusted under 35 U.S.C. 154(b) by 281 days.

(21) Appl. No.: 10/867,610

(22) Filed: Jun. 14, 2004

(65) Prior Publication Data

US 2006/0004789 A1    Jan. 5, 2006

(51) Int. Cl.
G06F 7/00    (2006.01)

(52) U.S. Cl. .......................................... 707/1
(58) Field of Classification Search .................. 707/100
See application file for complete search history.

(56) References Cited

U.S. PATENT DOCUMENTS

| | | | |
|---|---|---|---|
| 5,950,200 A | 9/1999 | Sudai et al. | |
| 5,963,951 A | 10/1999 | Collins | |
| 5,978,768 A | 11/1999 | McGovern et al. | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A * | 6/2000 | de l'Etraz et al. | 707/104.1 |
| 6,175,831 B1 | 1/2001 | Weinreich et al. | |
| 6,249,282 B1 | 6/2001 | Sutcliffe et al. | |
| 6,269,369 B1 * | 7/2001 | Robertson | 707/10 |
| 6,324,541 B1 | 11/2001 | de l'Etraz et al. | |
| 6,363,427 B1 | 3/2002 | Teibel et al. | |
| 6,366,962 B1 | 4/2002 | Teibel | |
| 6,370,510 B1 | 4/2002 | McGovern et al. | |
| 6,408,309 B1 | 6/2002 | Agarwal | |
| 6,542,748 B2 | 4/2003 | Hendrey et al. | |
| 6,735,568 B1 | 5/2004 | Buckwalter et al. | |
| 2002/0004784 A1 * | 1/2002 | Forbes et al. | 705/51 |
| 2002/0059201 A1 * | 5/2002 | Work | 707/3 |
| 2002/0086676 A1 | 7/2002 | Hendrey et al. | |
| 2002/0099947 A1 * | 7/2002 | Evans | 713/193 |

(Continued)

OTHER PUBLICATIONS

The Authoritative Dictionary of IEEE Standards Terms, Seventh Edition, 2000, Standards Information Network IEEE Press.*

(Continued)

*Primary Examiner*—Tim T Vo
*Assistant Examiner*—Aaron Sanders
(74) *Attorney, Agent, or Firm*—Patterson & Sheridan LLP

(57) ABSTRACT

Social network information maintained in a first database is shared with a second database. The operators of the second database use the social network information to better manage services provided to their customers and target particular information to their customers. The process begins with a request made to an application server of the first database by an application server of the second database, for social network information relevant to a set of individuals. The request includes identifying information of each individual in the set. The first database is then searched for matches with the identifying information in the request. If matches are found, the social network information relevant to those individuals for whom matches are found is shared with the second database.

13 Claims, 8 Drawing Sheets

U.S. PATENT DOCUMENTS

| | | | |
|---|---|---|---|
| 2003/0154194 A1 | 8/2003 | Jonas | |
| 2004/0034601 A1 | 2/2004 | Kreuzer | |
| 2004/0128322 A1* | 7/2004 | Nagy | 707/104.1 |
| 2004/0144301 A1 | 7/2004 | Neudeck et al. | |
| 2004/0148275 A1 | 7/2004 | Achlioptas | |
| 2004/0215648 A1* | 10/2004 | Marshall et al. | 707/102 |
| 2005/0010551 A1* | 1/2005 | McGeachie et al. | 707/1 |
| 2005/0015432 A1* | 1/2005 | Cohen | 709/201 |
| 2005/0021750 A1* | 1/2005 | Abrams | 709/225 |
| 2005/0120084 A1* | 6/2005 | Hu et al. | 709/206 |
| 2005/0198031 A1* | 9/2005 | Pezaris et al. | 707/9 |
| 2005/0273378 A1* | 12/2005 | MacDonald-Korth et al. | 705/10 |
| 2006/0136418 A1* | 6/2006 | Brydon et al. | 707/9 |
| 2006/0136419 A1* | 6/2006 | Brydon et al. | 707/9 |

OTHER PUBLICATIONS http://en.wikipedia.org/wiki/MD5.*
http://en.wikipedia.org/wiki/SHA-1.*
Bedell, Doug, "Meeting your new best friends Six Degrees widens your contacts in exchange for sampling Web sites", The Dallas Morning News, Oct. 27, 1998.*
U.S. Appl. No. 10/462,142, filed Jun. 16, 2003, Abrams.
U.S. Appl. No. 10/854,057, filed May 26, 2004, Galbreath et al.
U.S. Appl. No. 10/854,054, filed May 26, 2004, Galbreath et al.

* cited by examiner

FIG. 3

Adjacency List

| |
|---|
| ME: A, B, C |
| A: ME, F, G |
| B: ME, H |
| C: ME, D, E |
| D: C, I, J |
| E: C, K |
| F: A, L |
| G: A, H |
| H: B, G |
| I: D, N |
| J: D |
| K: E |
| L: F, M |
| M: L |
| N: I, O |
| O: N |
| P: Q, R |
| Q: P, R |
| R: P, Q |
| S: |
| T: U |
| U: T |

METHOD FOR SHARING RELATIONSHIP INFORMATION STORED IN A SOCIAL NETWORK DATABASE WITH THIRD PARTY DATABASES

BACKGROUND OF THE INVENTION

1. Field of the Invention

The present invention generally relates to data processing, and more specifically, to a method and system for sharing social network information that indicates the relationships among a group of individuals, with existing user databases.

2. Description of the Related Art

Many entities maintain databases containing records related to particular individuals, ranging in size from a handful of records to many millions. Some businesses have attempted to access the vast amount of information stored in these databases to exploit the potential marketing opportunities associated with them, but many of these businesses experienced failure, some as a result of backlash from the database owners, and some as a result of backlash from the customers themselves.

In recent years, the failure rate has increased even more due to stricter privacy laws and regulations, and in many instances, the privacy policies of the entities maintaining the databases, which require the information contained in these databases to be kept confidential and not be shared with third parties. As a result, without the luxury of buying into an existing customer database or exchanging customer database content with another party, businesses are finding out that the process associated with building up a customer base has slowed and costs increased.

SUMMARY OF THE INVENTION

The invention provides an online environment where certain information maintained in a database may be shared with another database without receiving or disclosing information that would violate confidentiality obligations under many of the privacy laws, regulations and policies. In particular, the invention provides a method by which social network or relationship information maintained in one database may be shared with another database without receiving or disclosing personal information about the individuals in the social network.

In one embodiment of the invention, a requesting entity provides a set of shared credentials corresponding to identifying information about individuals, to an operator of an online social network. An application server of the online social network processes the request by comparing each shared credential against shared credentials of its members. The application server finds the matches, and returns the matching shared credentials and an indication of the relationships between the individuals identified by the matching shared credentials. The requesting entity stores the indication of the relationships in its database and uses that information to better serve its customers.

By having a way of obtaining relationship information from an online social network, operators of online services can manage services based on the relationships between their customers. For example, a site offering a directory of members may allow each member to limit who may access his or her member information, or who may communicate with him or her, based on the closeness of the relationship between the requesting member and him or her. In addition, providers of online services may use methods of the present invention to allow users to control the accessibility of personal information maintained in an online environment. Furthermore, operators of existing database are better able to target particular information (e.g. advertisements) to individuals with an interest in receiving it, based on the premise that people closely related to one another in a social network share common interests, goals, lifestyles, and the like.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a sample adjacency list that is maintained by the graphs servers of the present invention;

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
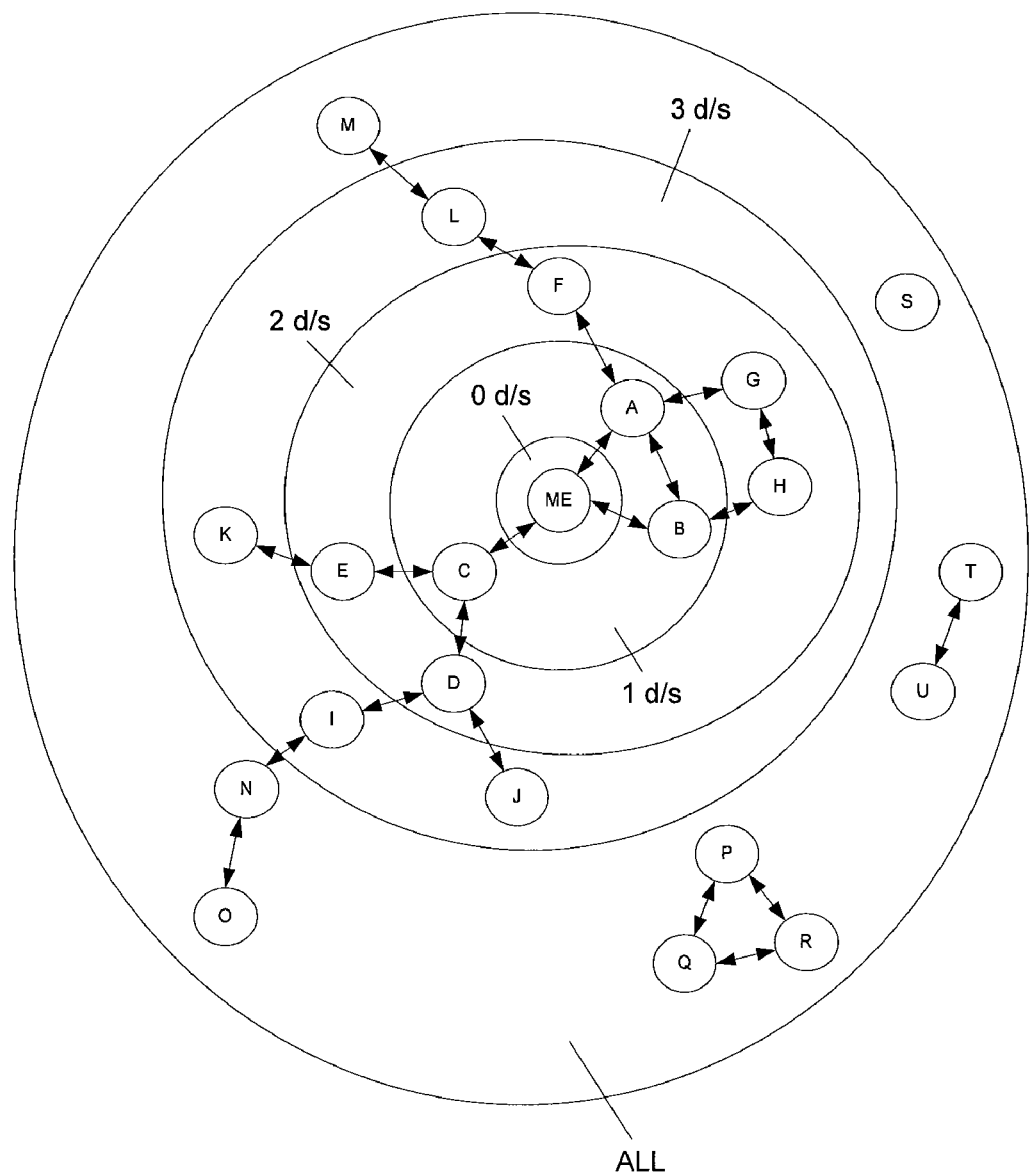
FIG. 1 is a diagram illustrating the relationships between members in a social network.

FIG. 1 illustrates a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category All.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
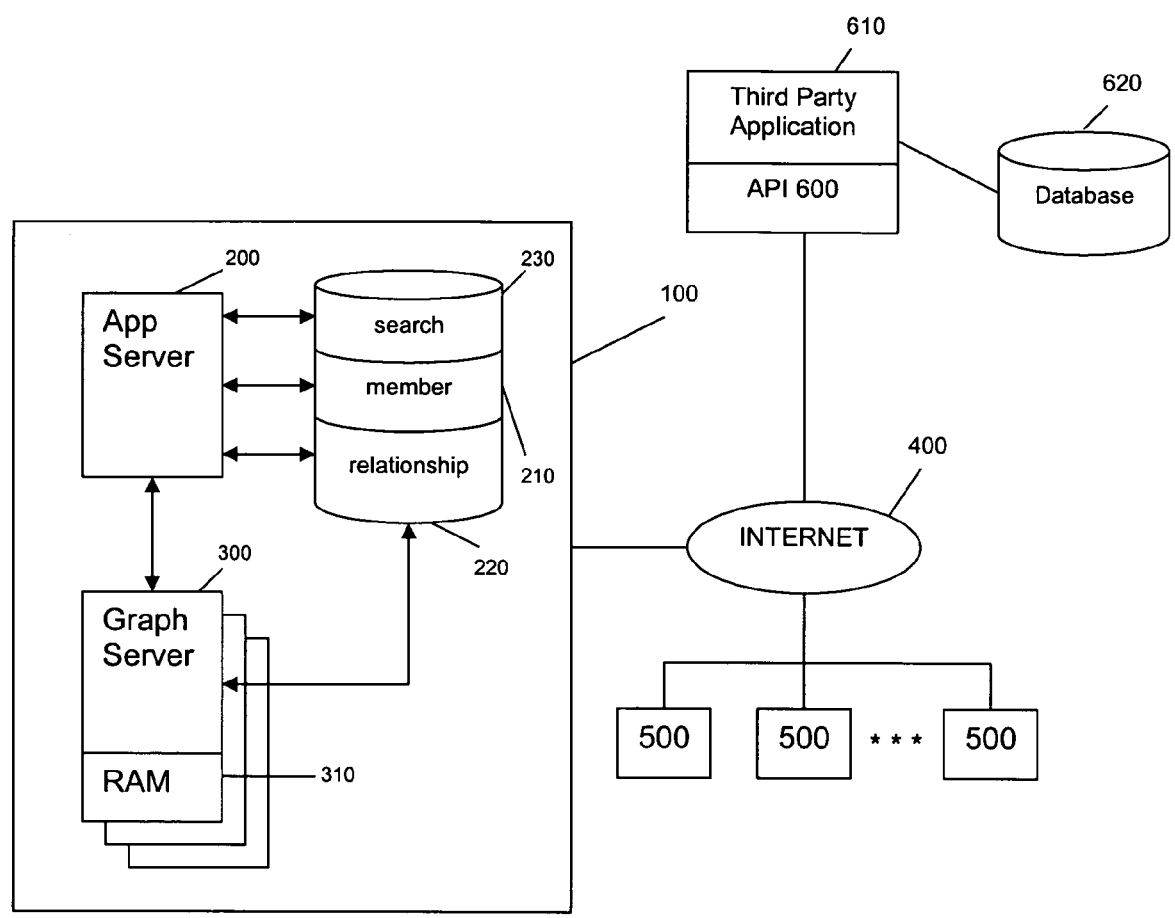
FIG. 2 is a block diagram illustrating a system for providing relationship information from a social network to an existing database, according to one embodiment of the present invention.

FIG. 2 is a block diagram illustrating a system for creating and managing an online social network. As shown, FIG. 2 illustrates a system 100, including an application server 200 and graph servers 300. The computers of system 100 are connected by a network 400, e.g., the Internet, and accessible by over the network by a plurality of computers, collectively designated as 500. The application server 200 manages a member database 210, a relationship database 220, and a search database 230.

The member database 210 contains profile information for each of the members in the online social network managed by the system 100. The profile information may include, among other things: a unique member identifier, name, age, gender, location, hometown, references to image files, listing of interests, attributes, and the like. The profile information also includes VISIBILITY and CONTACTABILITY settings, the uses of which are described in a commonly owned, co-pending application, "System and Method for Managing Information Flow Between Members of an Online Social Network," Ser. No. 10/854,057, filed May 26, 2004, the contents of which are hereby incorporated by reference. The relationship database 220 stores information defining to the first degree relationships between members. The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The application server 200 also manages the information exchange requests that it receives from the remote computers 500. The graph servers 300 receive a query from the application server 200, process the query and return the query results to the application server 200. The graph servers 300 manage a representation of the social network for all the members in the member database. The graph servers 300 have a dedicated memory device 310, such as a random access memory (RAM), in which an adjacency list that indicates all first degree relationships in the social network is stored.

A sample adjacency list that reflects the social network map of FIG. 1 is shown in FIG. 3. A list item is generated for each member and contains a member identifier for that member and member identifier(s) corresponding to friend(s) of that member. As an alternative to the adjacency list, an adjacency matrix or any other graph data structure may be used. The graph servers 300 and related components are described in detail in a commonly owned, co-pending application, "System and Method for Managing an Online Social Network," Ser. No. 10/854,054, filed May 26, 2004, the contents of which are hereby incorporated by reference.

The graph servers 300 respond to requests from application server 200 to identify relationships and the degree of separation between members of the online social network. The application server 200 is further configured to process requests from a third party application 610 to provide social network information (e.g., the relationships between individuals) for user records maintained in a third party database 620. The third-party application 610 makes the requests to the application server 200 through an application programming interface (API) 600.

The API 600 provides application developers with a set of methods, method signatures, data structures, and the like that expose an interface used by the third party application 610 to communicate with the application server 200. Application developers use the methods defined by the API 600 to construct applications that can communicate with the application server 200. There are many programmatic and syntactical choices to define the API methods that will effectively encapsulate the data and operations that are used in the invention. Thus, specific API methods, routines and data structures described below are illustrative in nature and are neither limiting nor definitive of the API 600.

Figure 4:
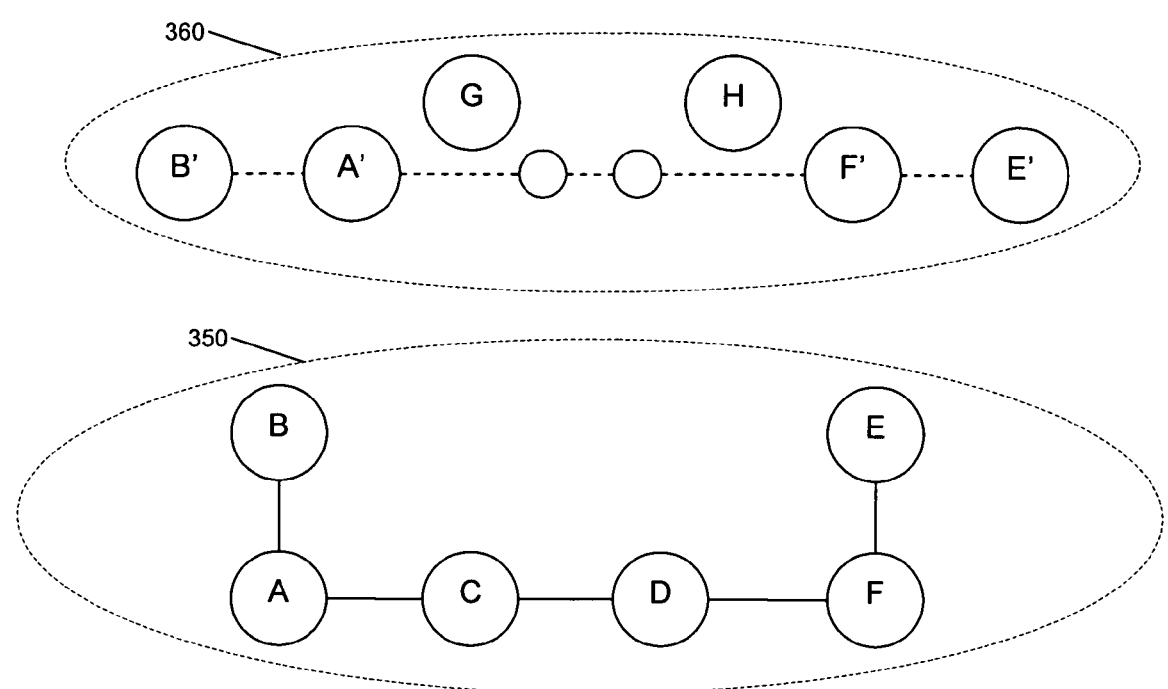
FIG. 4 is a block diagram illustrating the relationships between members in a social network and the relationships between users in an existing database.

FIG. 4 illustrates an example of a subset of a social network graph 350 maintained by the graph servers 300 along with a subset of database records 360 maintained in the third party database 620. As depicted, the subset 350 includes members A, B, C, D, E and F, and the subset 360 include records for A', B', E', F', G and H. A and A' represent the same individual but are labeled differently to signify that a database record for this person exists in both the member database 210 and the third party database 620. The same is true for: B and B', E and E', and F and F'. By contrast, database records for individuals C, D exist in the member database 210, but not in the third party database 620, and database records for individuals G, H exist in the third party database 620, but not in the member database 210.

The relationships between individuals A, B, C, D, E and F are maintained in the relationship database 220 and the graph servers 300. The flow diagram shown in FIG. 5 is used to find out the relationships between individuals A', B', E', F', G and H, namely to obtain the social network information used to construct the edges (shown as dashed lines in FIG. 4) between (A', B'), (E', F') and (A', F').

Figure 5:
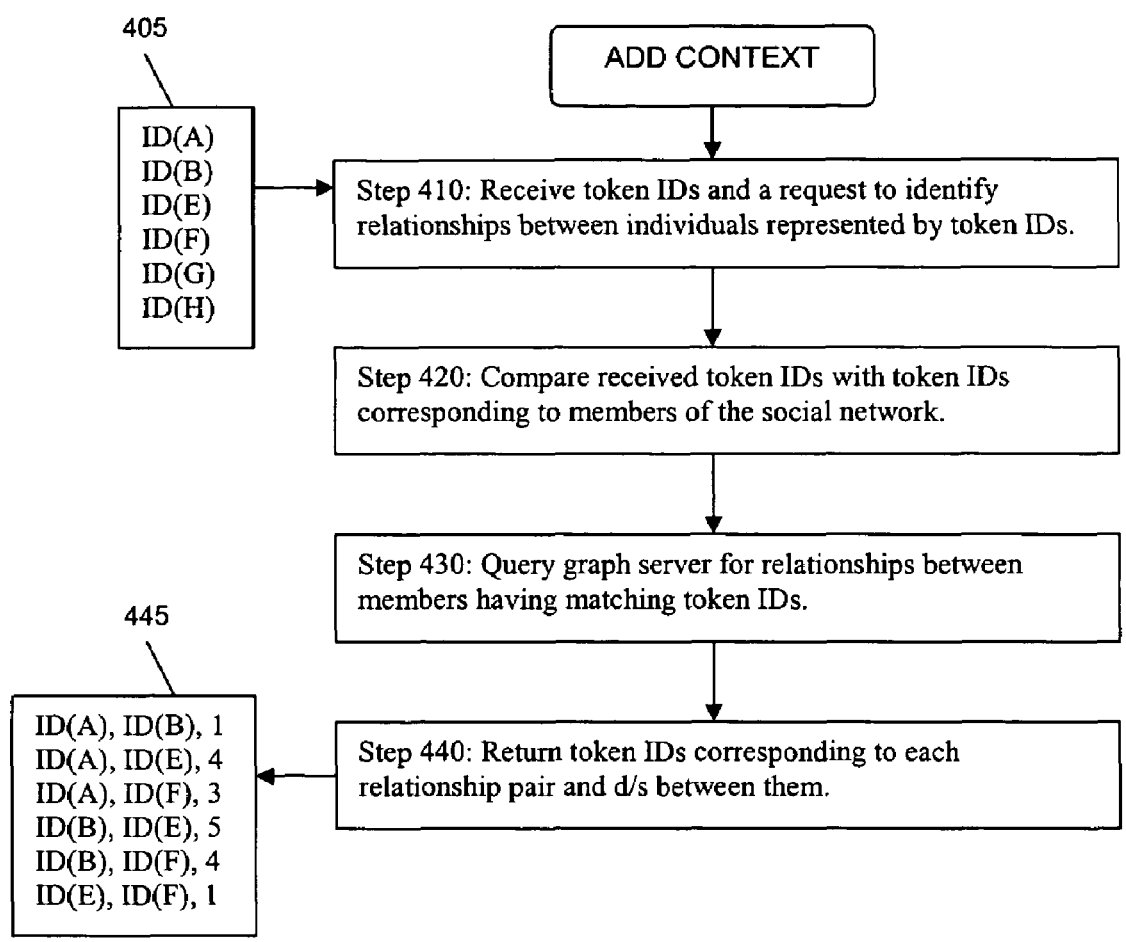
FIG. 5 is a flow diagram illustrating a method for providing relationship information to an existing database.

FIG. 5 is a flow diagram that illustrates a method for processing a request for social network information by the third party application 610 in the system of FIG. 2. In Step 410, the application server 200 receives a request from the third party application 610 to identify social network relationships (i.e., the edges between nodes) among users who are represented by a set of ID tokens 405. For example, API 600 may provide a method to make such a request according to the following:

relationship_pairs[ ] find_Connections(ID_Tokens[ ],
       credential_Type, hash_Type).

The find_Connections method accepts an array of ID Tokens, an indication of the type of shared credentials used (credential_Type), and an indication of the type of hash algorithms used (hash_Type). In response, the find_Connections method returns an array of relationship pairs comprising two ID tokens and an indication of the relationship between the members represented by the two ID tokens.

The shared credential types include an e-mail address (credential_Type=1), first and last name (credential_Type=2), telephone number (credential_Type=3), and any other types or a combination of two or more types that might be used to identify an individual. Of the three types specifically identified here, the e-mail address type is preferred, because in most instances an e-mail address is associated with a single individual.

The hash algorithm types include none (hash_Type=0), MD5 one-way hash algorithm (hash_Type=1), and SHA-1 one-way hash algorithm (hash_Type=2). When hash_Type=1 or 2, the corresponding one-way hash algorithm is used to create a hash value from the identifying information associated with the credential type selected (e.g., e-mail, first and last name, telephone number, etc.), and the hash value is used as a shared credential. When hash_Type=0, a hash algorithm is not used and the shared credential comprises the identifying information associated with the credential type selected (e.g., e-mail, first and last name, telephone number, etc.).

In Step 420, after receiving the set of the ID tokens 405 from the third party application 610, the application server 200 compares the value of each ID token from the set against ID tokens corresponding to the members of the online social network. The ID tokens corresponding to the members of the online social network are generated using the shared credential type and the hash algorithm type specified in the variables credential_Type and hash_Type. A match from this comparison indicates that there is a record for that individual in both the third party database 620 and in the member database 210.

For some embodiments, the application server 200 may improve its processing efficiency by generating the ID tokens for its members ahead of time and having them stored for use in the comparison of Step 420. For example, the application server 200 may maintain an index of unique member identifiers, each associated with the corresponding member's e-mail address (credential_Type=1, hash_Type=0), a hash value generated from the corresponding member's e-mail address using the MD5 hash algorithm (credential_Type=1, hash_Type=1), and a hash value generated from the corresponding member's e-mail address using the SHA-1 hash algorithm (credential_Type=1, hash_Type=2).

At this point, the application server 200 has identified which ID Tokens have a member profile in the online social network. In Step 430, the application server 200 queries the graph servers 300 to obtain the specific relationship information for the identified members. For example, referring to FIG. 4, for each member pair: (A, B), (A, E), (A, F), (B, E), (B, F), and (E, F), the application server 200 issues a query to the graph servers 300 to obtain the degree of separation between the member pair.

Then, in Step 440, the application server 200 returns an array 455, which includes the ID tokens corresponding to each member pair and the degree of separation obtained for each member pair, e.g., (A, B, 1), (A, E, 4), (A, F, 3), (B, E, 5), (B, F, 4), and (E, F, 1). Optionally, other attributes, e.g., demographic information, may be returned. Using the ID tokens that are returned, the third party application 610 identifies the corresponding members in the third party database 620, and records the degrees of separation between the member pairs.

Note, in the above example, the application server 200 returns a pair indicating a third degree relationship between A and F, but does not include the connecting members, C and D. Unless the set of ID tokens 405 includes a token for each member with a record in the online social network, the information returned by the application server 200 may be incomplete in some respects. In other words, when the relationship graph is reconstructed from the information returned by the application server 200, A and F will be connected to two dummy nodes.

In another embodiment of the invention, the third party application 610 may use a method from API 600 that requires the passing of a single ID token (e.g., corresponding to member M1), a shared credential type, a hash algorithm type, and a d/s setting N, in its request to the application server 200. In response, the application server 200 returns an indication of M1's social network up to N degrees of separation. The method signature is as follows:

network get_Network(ID_Token, credential_Type, hash_Type, N)

The d/s setting N is optional. If it is omitted, a default value, e.g., 3, is used. If it is specified, the application server 200 returns an indication of M1's social network up to the specified degree of separation.

After receiving the request according to the get_Network method, the application server 200 identifies the member corresponding to the ID token (e.g., M1) provided by the third party application 610. If the ID token does not correspond to any member, the application server returns an indication of this to the third party application 610. Otherwise, the application server 200 queries the graph servers 300 to identify the members of the online social network that are related to M1 within N degrees of separation (or a number specified in the get_Network method). For each member identified, the application server 200 creates an ID token in accordance with the shared credential type and the hash algorithm type specified in the request. The application server 200 returns all ID tokens so created along with an indication for each ID token the degree of separation from M1. The third party application 610 then uses the returned set of ID tokens to determine whether the third party database 620 contains records corresponding to the members in M1's social network, and if there are, it stores the degree of separation information for each such record.

As an example, the third party application 610 may be an online gaming site and the third party database 620 may be the database of registered users maintained by the online gaming site. The process described above would be used by the online gaming site to obtain social network information for its registered users from the computer system of FIG. 2, so that each time a registered user logs in to play, the online gaming site can invite (by e-mail or IM, for example) one or more additional registered users in his or her network to log on and play as well.

The present invention may also be used to clarify ambiguities in certain requests for information. For example, if a user queried an online telephone directory for the number of "John Smith," many results may be returned. The online telephone directory could use the get_Network API method to query the application server 200 to identify a John Smith present in the requestor's social network, likely eliminating all but one "John Smith" from consideration.

Figure 6A:
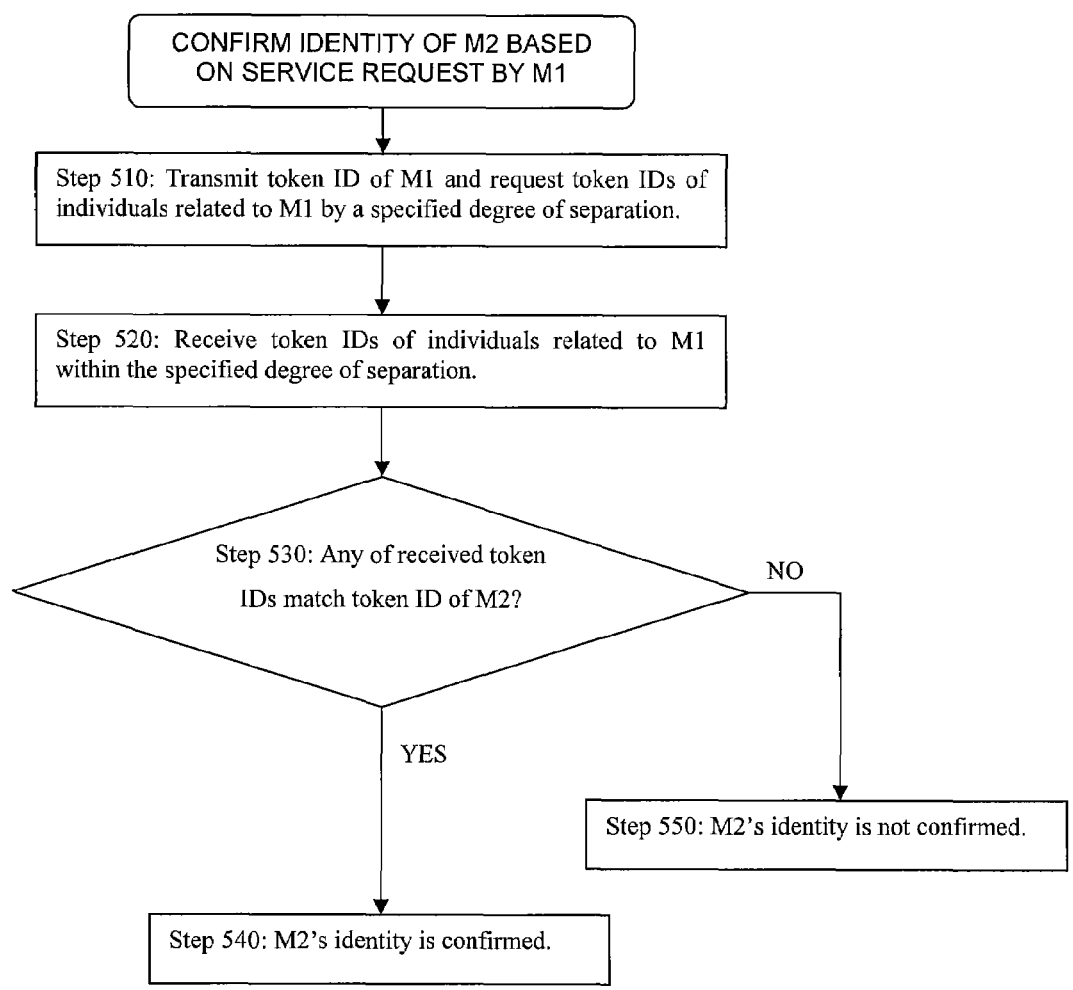
FIGS. 6A and 6B are flow diagrams illustrating methods for using relationship information obtained from a social network according to embodiments of the present invention.

FIG. 6A illustrates the above process in further detail. In Step 510, the ID token of the user requesting the number of "John Smith" (e.g., M1) is transmitted by the third party application 610 to the application server 200 along with the get_Network request which also specifies the shared credential type used, the hash algorithm type used, and the d/s setting N. The application server 200 then compares the ID token of the requesting user with the ID tokens of its members. If a match is found, the application server 200 queries the graph server 300 for all members related to the member corresponding to the matching ID token within N degrees of separation. The ID tokens of all such members are then transmitted to the third party application 610. The third party application 610 receives these ID tokens (Step 520) and compares them against the ID token of a "John Smith" candidate (Step 530). If there's a match, it is confirmed that the "John Smith" candidate is the "John Smith" that M1 is looking for (Step 540). If there is not a match, the "John Smith" candidate is not confirmed as the "John Smith" that M1 is looking for (Step 550), and the third party application 610 compares the received ID tokens against the ID token of another "John Smith" candidate. This process is repeated until a match is found or all "John Smith" candidates have been exhausted.

The application server 200 may be configured to provide the degree of separation between two individuals. A method signature from the API 600 call for this could be the following:

get_Degrees(ID_Token1, ID_Token2, credential-
        _Type, hash_Type);

The application server 200 processes this call in a manner similar to the above calls. First, the application server 200 resolves which members in the member database 210 correspond to ID_Token1 and ID_Token2. If the application server 200 is unable to resolve one or both an error is returned. Otherwise, the application server 200 queries the graph servers 300 to determine the degree of separation between the members corresponding to ID_Token1 and ID_Token2. Once determined, the application server 200 returns a number as the degree of separation between the two members. Using the degree of separation between the two individuals, the third party application 610 may manage transaction processing based on the relationship (or lack thereof) between the two members.

Figure 6B:
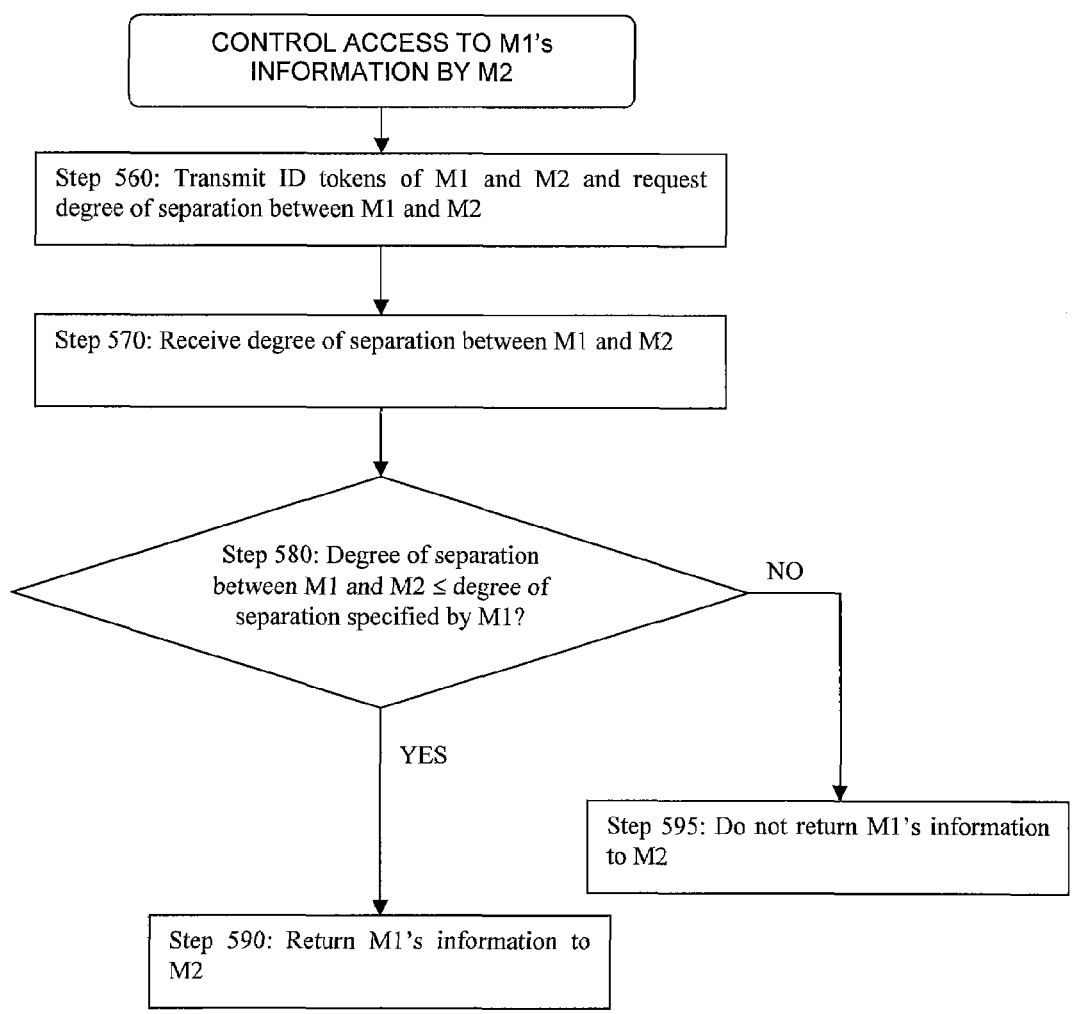

The third party application 610 may use this information to control the visibility of information in the third party database 620. For example, the third party application 610 might store telephone numbers, or other personal information related to a user M1 in the third party database 620, and an access preference from M1 that specifies how closely related to M1 a user has to be (expressed in terms of degrees of separation) in order to view M1's phone number. Using the relationship information obtained from the online social network as described above, the third party application 610 may limit access to M1's information stored in the third party database 620 to only those users who are within N degrees of separation, where N is the degree of separation specified by M1 in the access preference. FIG. 6B is a flow diagram that illustrates this process. First, when a user (M2) indicates to the third party application 610 that he or she wishes to view M1's information, the third party application 610 queries the online social network for the degree of separation between M1 and M2 using the get Degrees call described above (Step 560). In response, the third party application 610 receives the degree of separation information (Step 570). If the degree of separation between M1 and M2 is less than or equal to the degree of separation specified by M1, M1's information stored in the third party database 620 is returned to M2 (Steps 580 and 590). Otherwise, M1's information stored in the third party database 620 is not returned to M2 (Steps 580 and 595).

In the above examples, as an alternative to the MD5 and SHA-1, Message Authentication Code (MAC) may be used as the hash algorithm. MAC is also a one-way hash algorithm but uses a secret key that the party maintaining social network information and the party requesting social network information through the API 600 would agree to in advance. The use of the key provides extra security.

FIG. 2 depicts the third party database 620 to be external to the computer system 100 of the online social network. In alternative embodiments of the invention, the operator of the online social network may act as an application service provider (ASP) that maintains the third party database 620, on behalf of the third party, within the computer system 100. In such a case, the online social network periodically maps the social network information maintained by its graph servers 300 onto the third party database 620, so that the social network information will be made available for use without the information flow that is illustrated in FIGS. 5 and 6A or 6B.

Figure 7:
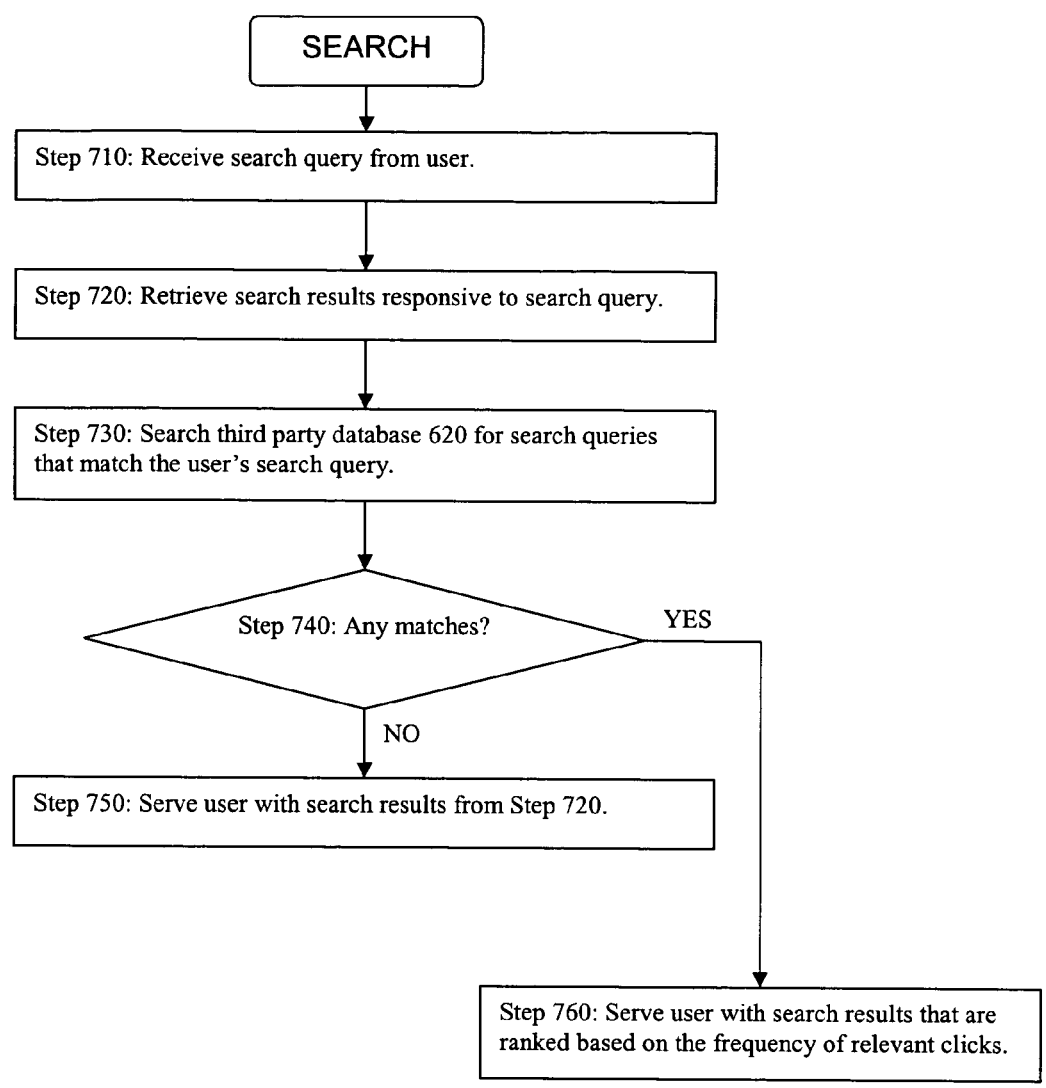
FIG. 7 is a flow diagram illustrating a method for carrying out a search request using relationship information obtained from a social network.

FIG. 7 is a flow diagram illustrating the steps carried out by a search engine that uses social network information to tailor search results delivered to its users in response to a search query. In this example, the third party application 610 is a search engine operator that manages a search results database, and the third party database 620 is a user database that keeps track of all search queries specified by each user and, for each such search query, a record of all hyperlinks that the user clicked on when search results responsive to the search query were served to the user.

In Step 710, the third party application 610 receives a search query from a user. In Step 720, the third party application 610 retrieves the search results responsive to the search query from its search results database. In Step 730, the third party application 610 searches the third party database 620 for search queries that match the one received from the user in Step 710. If there are no matches, the search results retrieved in Step 720 are served to the user (Steps 740 and 750). If there is one or more matches, the search results are ranked based on the frequency of "relevant" clicks on the hyperlinks associated with the search results and then served to the user (Steps 740 and 760). Frequency of clicks is equal to the number of prior clicks on a hyperlink divided by the number of times that hyperlink was displayed, and hyperlinks with higher frequencies are ranked higher than hyperlinks with lower frequencies. Relevant clicks are those clicks made by users who are within a specified degree of separation from the user who requested the search. The degree of separation information (i.e., social network or relationship information) may be maintained by the third party application 610 or obtained from an online social network in the manner described above in connection with FIG. 5. The specified degree of separation may be any number or set as ALL, in which case all clicks become relevant, and it may be set by the operator of the search engine, or it may be set by a user in his or her profile. For example, if the user sets the specified degree of separation as 1, only clicks made by those who are friends of the user become relevant clicks.

The computer system 100 of the online social network may also deliver Internet search results to members of the online social network and to Internet users who are not members of the online social network. In this example, the computer system 100 is provided with an Internet search results database and an Internet search query database that keeps track of all Internet search queries specified by each member of the online social network and, for each such search query, a record of all hyperlinks that the member clicked on when search results responsive to the search query were served to the member.

When the computer system 100 receives an Internet search query from one of its members, it retrieves the search results responsive to the search query from the Internet search results database, and searches the Internet search query database for search queries that match the one received from the member. If there are no matches, the search results retrieved from the Internet search results database are served to the member. If there is one or more matches, the search results retrieved from the Internet search results database are ranked based on the frequency of "relevant" clicks on the hyperlinks associated with the search results and then served to the member. Relevant clicks are those clicks made by members who are within a specified degree of separation from the member who requested the search. The specified degree of separation may be any number or set as ALL, in which case all clicks become relevant, and it may be set by the operator of the online social network, or it may be set by a member in his or her profile. For example, if the member sets the specified degree of separation as 1, only clicks made by those who are friends of the members become relevant clicks.

When the computer system 100 receives an Internet search query from an Internet user who is not a member of the online social network, it retrieves the search results responsive to the search query from the Internet search results database, and searches the Internet search query database for search queries that match the one received from the user. If there are no matches, the search results retrieved from the Internet search results database are served to the user. If there is one or more matches, the search results retrieved from the Internet search results database are ranked based on the frequency of clicks on the hyperlinks associated with the search results and then served to the user.

While particular embodiments according to the invention have been illustrated and described above, those skilled in the art understand that the invention can take a variety of forms and embodiments within the scope of the appended claims.

The invention claimed is:

1. A method of providing information about relationships between individuals, comprising the steps of:
   receiving, at a computer system for an online social network that manages a member database, a request from a third party computer system that manages a third party database, to identify relationships of an individual who has a record in the third party database, over a computer network, the request including an ID token of the individual;
   identifying, at the computer system for the online social network, the relationships of the individual using the ID token and records stored in the member database by: (i) generating ID tokens of records stored in the member database, (ii) locating a record stored in the member database having an ID token that matches the ID token of the individual, and (iii) identifying records stored in the member database corresponding to individuals who are related to the individual; and
   returning, from the computer system for the online social network, an indication of the relationships to the third party computer system over the computer network, the indication of the relationships including ID tokens generated from records stored in the member database corresponding to individuals who are related to the individual;
   wherein the ID token of the individual and the ID tokens of records stored in the member database are hash values generated using a one-way hash algorithm.

2. The method of claim 1, further comprising the step of determining a degree of separation for each of the identified relationships, wherein the step of returning includes the step of returning the determined degree of separation for each of the identified relationships.

3. The method of claim 1, wherein the request includes a request to identify relationships of several individuals and is formatted in accordance with a pre-defined API.

4. The method of claim 3, wherein the several individuals includes a first individual and a second individual, and the step of identifying includes the step of identifying the relationship between the first individual and the second individual.

5. The method of claim 1, wherein the ID token of the individual is generated from an e-mail address of the individual.

6. A method of processing a request for information about a second individual made by a first individual over a computer network and returning the information to the first individual over the computer network, comprising the steps of:
   generating, at a first computer system that manages a first database, an ID token of the first individual and an ID token of the second individual upon receipt of the request for information about the second individual made by the first individual;
   transmitting, from the first computer system, the ID token of the first individual and a request for information about the first individual's social network to a second computer system that manages a second database, over the computer network;
   receiving, at the first computer system, ID tokens of individuals in the first individual's social network from the second computer system over the computer network in response to the step of transmitting;
   determining, at the first computer system, that an ID token of any of the individuals in the first individual's social network matches the ID token of the second individual; and
   returning the information from the first computer system to the first individual;
   wherein the ID token of the first and second individuals and the ID tokens of individuals in the first individual's social network are generated using a common algorithm, wherein the common algorithm comprises a one-way hash algorithm.

7. The method of claim 6, wherein the ID tokens are generated using e-mail addresses of the individuals.

8. A method of controlling access to information of a first individual in response to a request for the information by a second individual and returning the information to the second individual based on the relationship between the first and second individuals, comprising the steps of:
   generating, at a local computer system that manages a first database, an ID token of the first individual and an ID token of the second individual from records stored in the first database using a one-way hash algorithm;
   transmitting a request for information about a relationship between the first and second individuals over a computer network from the local computer system to a third party computer system that manages a second database, the request including the ID tokens of the first and second individuals and identifying the one-way hash algorithm used to generate the ID tokens;
   receiving, at the local computer system, information about the relationship between the first and second individuals over the computer network from the third party computer system; and
   returning the information from the local computer system to the second individual based on the relationship between the first and second individuals.

9. The method of claim 8, wherein the ID tokens are generated from e-mail addresses of the first and second individuals.

10. The method of claim 8, wherein the information about the relationship between the first and second individuals indicates a degree of separation between the first and second individuals.

11. The method of claim 10, further comprising the step of receiving an indication of a preference setting of the first individual, wherein the information is returned to the second individual if the degree of separation between the first and second individuals is less than or equal to the preference setting of the first individual.

12. The method of claim 8, wherein the request transmitted to the third party computer system over the computer network is formatted in accordance with an API that has been developed to work with the third party computer system.

13. The method of claim 6, wherein the request includes a degree of separation value (N), and the received ID tokens of individuals in the first individual's social network consist of ID tokens of those individuals in the first individual's social network who are less than or equal to N degrees of separation away from the first individual.

* * * * *